May 12, 1942.  G. INNES  2,282,868

PICK-UP AND DELIVERY MECHANISM

Filed Jan. 8, 1940  3 Sheets-Sheet 1

INVENTOR.
GEORGE INNES

BY
Merrill M. Blackburn
ATTORNEY

INVENTOR.
GEORGE INNES
BY
Merrill M. Blackburn
ATTORNEY

May 12, 1942.                G. INNES                2,282,868
PICK-UP AND DELIVERY MECHANISM
Filed Jan. 8, 1940            3 Sheets-Sheet 3

INVENTOR.
GEORGE INNES
BY Merrill M. Blackburn
ATTORNEY

Patented May 12, 1942

2,282,868

UNITED STATES PATENT OFFICE 2,282,868

PICKUP AND DELIVERY MECHANISM

George Innes, Davenport, Iowa

Application January 8, 1940, Serial No. 312,935

7 Claims. (Cl. 56—364)

The present invention relates to an agricultural pick-up and delivery mechanism, for picking up vegetable stalks from the ground and delivering the stalks so picked up to suitable processing mechanism, such as a combine-harvester-thresher. The present invention relates more particularly to a mechanism for picking up vegetable stalks from windrows and involves means for spreading the vegetable stalks so picked up from windrows in order to obtain even delivery to the processing mechanism, transversely of the windrows, over a more extended width than that of the windrow.

In my Patent No. 2,157,261, granted May 9, 1939, I have disclosed a somewhat similar pick-up and delivery mechanism. The mechanism there shown is of particular adaptability to the picking up of vegetable stalks from swath, as shown in Fig. 8 thereof, or of cutting its own swath by a suitable mechanism, as shown in Fig. 1. If, now, the mechanism shown in Fig. 8 of my patent is used in picking up from a windrow, the stalks will not be evenly distributed over the width of the apron 8 but will be mainly concentrated in the center thereof. Such concentration is undesirable when the pick-up is used on a combine thresher.

In the present specification and claims, I use the term "grain" in a generic sense to denote not only wheat, oats, barley, rye, and the like, but also other vegetation, such as rice, soy beans, clover, timothy, alfalfa, and various other seed-producing vegetable stalks.

In order to show the reason for existence of the present invention it will be necessary to discuss briefly the history of the development of pick-ups.

Fifteen years ago it was not believed that the combine method of harvesting would ever be much used in the areas that are called humid areas, i. e., those where there is sufficient moisture to grow crops without irrigation and without the employment of methods which are usually referred to as "dry farming." It was generally considered that, in humid agricultural areas, as are all of the states east of the Missouri River and from the Canadian border to the Gulf, combining would never be employed because the grain at harvest time carries too much moisture to be threshed and put into storage without musting and spoiling.

In 1927, the method of windrowing grain was adopted in this country and used as a means of drying grain in the humid areas so that threshing with a portable threshing machine, usually called a combine, could be accomplished. In other words, an implement is used to cut a swath of grain of some predetermined width, all the way from five feet to twenty feet, and then this grain is conveyed to one side and laid in a windrow where it is held off the ground by the stubble. It can now be left in the windrow to dry so that the moisture content will be reduced to 14 points, and then a combine provided with a pick-up device can go through the field picking up these windrows and depositing the material on conveyors by which it is conveyed to the threshing mechanism. This largely effects the economy which lies between the old method of binding and shocking and the method of direct combine harvesting.

Because the combines which had always been used in the West were large and expensive and were unwieldy on small farms, the method of windrowing was still impractical in the central and eastern states. Therefore, the industry set itself to designing a small combine which would be low in cost and which would be mobile and thus give to the small farmer the advantages and economy of combining without a prohibitive investment.

The first machine in the small class sold at about six hundred dollars and had a cylinder approximately the same length as the sickle. Other manufacturers of small combines were unwilling to make their cylinders substantially the same length as the sickle, so they reduced the length of the cylinder relatively to the sickle and put in means to gather the straw from one side or both so that it could be threshed by a short cylinder. Such efforts were mostly unsuccessful since they required a greater amount of power to turn the cylinder with the load condensed into a small space, thus necessitating a power unit which was expensive. It is obvious from this what the result is when the attempt is made to pick-up windrowed grain and thresh it with a small combine thresher. Since windrowing of grain in this area seems to be necessary for the proper curing of the grain, it appears to result in the necessity of having the cylinder of substantially the same length as the sickle. However, this cannot be done with a small combine-thresher, with the normal sized power plant, unless the grain, as it comes from the windrow, is spread out so as to be fed to the cylinder through substantially the entire length thereof. This has necessitated the invention of a method and apparatus for distributing the windrow.

When a combine-thresher, in which the cylinder is not constructed or intended to handle a thick mass of grain, is used to pick up a windrow and thresh it, it becomes necessary to slow down the process to such an extent that the capacity of the machine may not be utilized to more than 66%. Also, the cylinder, in being forced to take care of a mass of grain for which it was not designed, suffers so much abuse that the cheap and light weight cylinder will not stand up under the strain. It has therefore been necessary to devise a method and means for spreading out again the grain coming from the windrow so that it will be fed into substantially the entire length of the cylinder, thus reducing the strain to which it is subjected. Applicant recognized this problem several years ago and set about it to find a solution therefor. The present method and apparatus constitute his answer to this problem.

The device disclosed herein has an excessive velocity at the point of its greatest diameter, and this tends to pull the stalks out of the windrow as that is lifted by the pick-up and passed backwardly toward the apron. Since the rotating spreader preferably travels more rapidly than the grain stalks, it tends to pull them from the bottom of the mass which has been more or less loosened by the pick-up and somewhat by the spreader. Since the spreader is provided with a plurality of edges, these grip the grain more or less and tend to throw it off in the direction of rotation of the spreader units. Since these rotate at an angle to the direction of rotation of the pick-up, there is a tendency to throw the grain forwardly in its course of travel and laterally toward the edges of the apron. Also, since the spreader is higher under the middle of the delivered windrow than at the sides of the machine, there is a tendency for the grain to slide down along the top edge of the spreader, this also tending to spread out the grain to the full width of the machine.

From what has been said, it will be apparent that the under side of the windrow, as delivered by the pick-up, will be both beaten and pulled, resulting in tearing the windrow apart and spreading it out, since the beating and pulling occurs in different directions because the spreader sections rotate about axes which are at an angle to each other. If the thresher cylinder is comparatively short, the central portion of the distributor will be used in the lowered position, but, on the other hand, if the cylinder is seven or eight feet long, it will be necessary to raise the central portion of the distributor so as to give a wider distribution of the grain on the apron.

In accordance with the present invention, I provide a combination by which the grain, as picked up, is distributed over the width of the delivery mechanism in somewhat even arrangement rather than being concentrated, as heretofore, when the grain is picked up from a windrow.

One specific form of the present invention is illustrated in the accompanying drawings, forming a part of the present disclosure and in which Fig. 1 is a plan showing the distributor in longitudinal, approximately horizontal section;

Reference will now be made in greater detail to the annexed drawings for a more complete description of this invention. It is evident that the pick-up drum 1, provided with the fingers 2, and the apron 3 are old construction, and therefore do not need to be described in detail. In this connection reference is made to my prior Patent No. 2,133,143, issued October 11, 1938.

Figure 1:
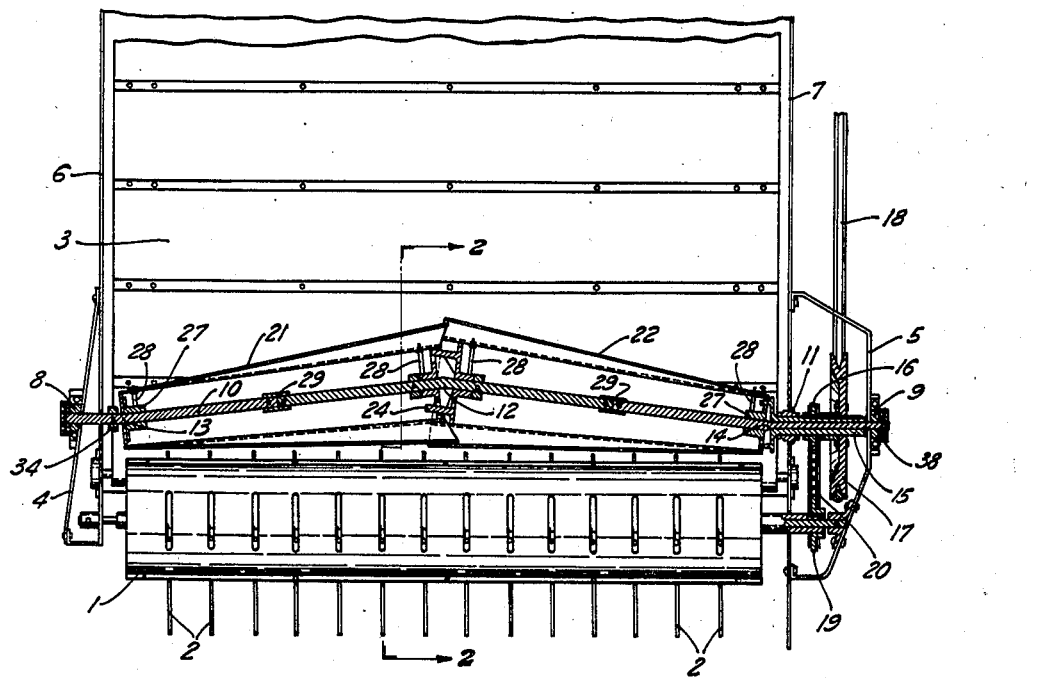
Figure 2:
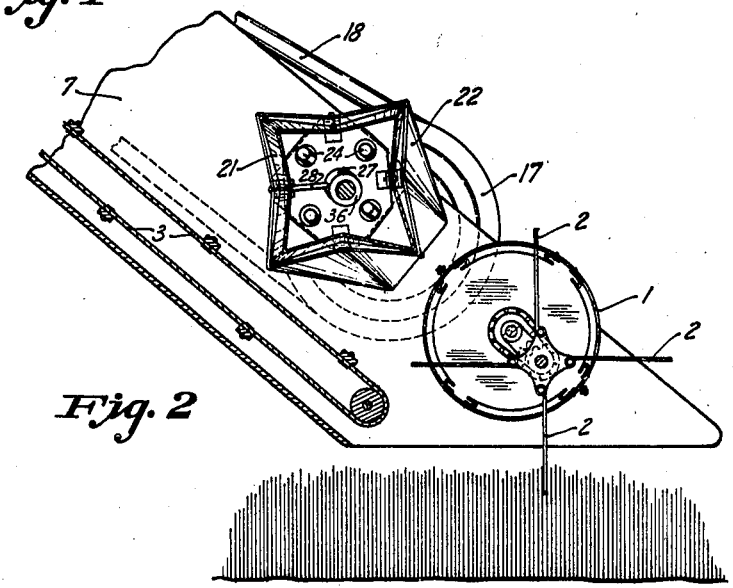
Fig. 2 is a vertical section substantially on the line 2—2 in Fig. 1.

Suitable supporting members 4 and 5 are mounted on the side pieces 6 and 7 of the framework of the machine, and brackets 8 and 9 are secured to these supporting members 4 and 5. A shaft 10 is supported in these brackets 8 and 9 and serves to support the distributing elements. A sleeve element 11 is supported in the side member 7 of the machine and assists in furnishing a support for the shaft 10. This shaft may be integral or made up of sections, as shown in Fig. 1. It is bent in the middle, as indicated at 12, and adjacent its ends, as indicated at 13 and 14. This permits the end portions of the shaft to extend outwardly at a right angle to the sides of the machine so that when the shaft is positioned in adjusting the height of the distributing element, no strain will be put upon the shaft and associated parts.

As shown at the right side of Fig. 1, a sleeve 15 surrounds the end of the shaft 10 which serves as a bearing for the sleeve. A sprocket wheel 16 is integral with or keyed to the sleeve 15 which has a grooved pulley 17 secured thereto. This pulley 17 is connected to the sleeve 15 in driving relation so that movement of the belt 18 will cause rotation of the sleeve 15 on the shaft 10, thereby causing turning of the sprocket wheel 16. This drives a chain 20 which passes over a sprocket wheel 19, connected in driving relation, either with the drum 1 or a rotor within the drum which carries the fingers 2. Therefore, when the belt 18 is driven, the pick-up is also driven, either by rotation of the drum 1 causing rotation of the cage within the drum or rotation of the cage causing rotation of the drum. It is obvious that a suitable drive may be provided for causing positive driving of both the drum and cage.

Figure 3:
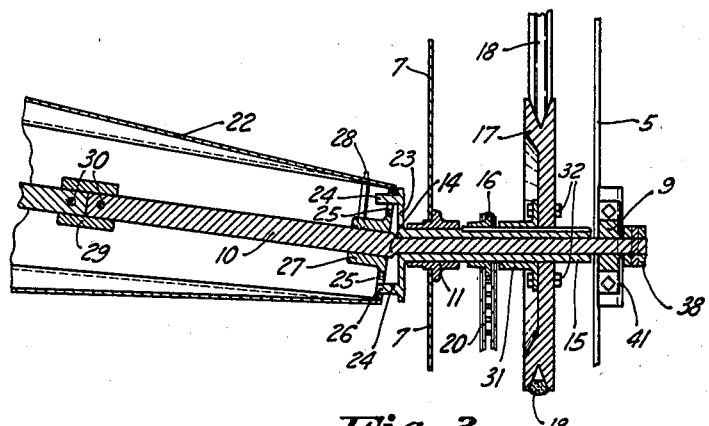
Fig. 3 is a fragmentary, horizontal, longitudinal section of the driven end of the slinger and of the drive means therefor.

Distributor elements 21 and 22 are mounted for rotation about the shaft 10, the element 21 being driven from the element 22, and the latter being driven from the belt 18 through pulley 17 and sleeve 15. Connected to the inner end of the sleeve 15 is a plate 23 which is a plate 23 which has a plurality (preferably four) of pins 24 projecting inwardly from the inner face thereof. These pins 24 project through openings 25 in an end plate 26 secured in the outer end of the distributor element 22. The plate 26 has a sleeve 27 integral with the inner face thereof, and this sleeve rotates on the shaft 10, as may be clearly seen from Fig. 3. One or more pins 28 project laterally from the sleeve 27 through a hole or holes in the element 22, thus insuring a driving connection between the plate 26 and the shell of element 22.

As has been indicated above, the shaft 10 may be either integral or sectional, but it is preferred to construct it in sections and connect these sections by sleeves 29 which are secured to the shaft by means of pins 30 or by other suitable means. A sleeve 31 surrounds the sleeve 15 and has a flange at one end which is secured to the pulley 17 by means of bolts 32. This assists in connecting the sleeve 15 and the pulley 17 in driving relation and also assists in preventing the pulley from wobbling. The plate 23 at the end of member 22 prevents the latter from moving laterally toward the side of the machine. At the opposite end of the grain distributor, there is a collar 34 which is pinned to the shaft and therefore prevents this section of the distributor from moving laterally toward the side of the machine. There are elements 27 and 28 at this end of the distributor, just as described in connection with the other end thereof.

Figure 4:
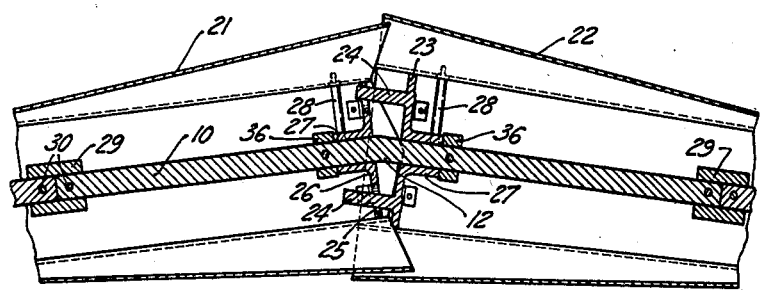
Fig. 4 is a detail, horizontal, longitudinal section of the central portion of the slinger showing the drive connection between the two sections thereof.
Figure 5:
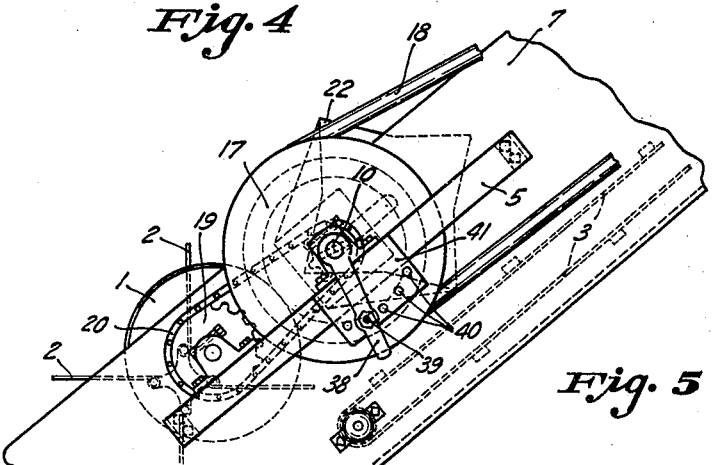
Fig. 5 is a view of the mechanism shown in Fig. 1, as viewed from the right side thereof.
Figure 6:
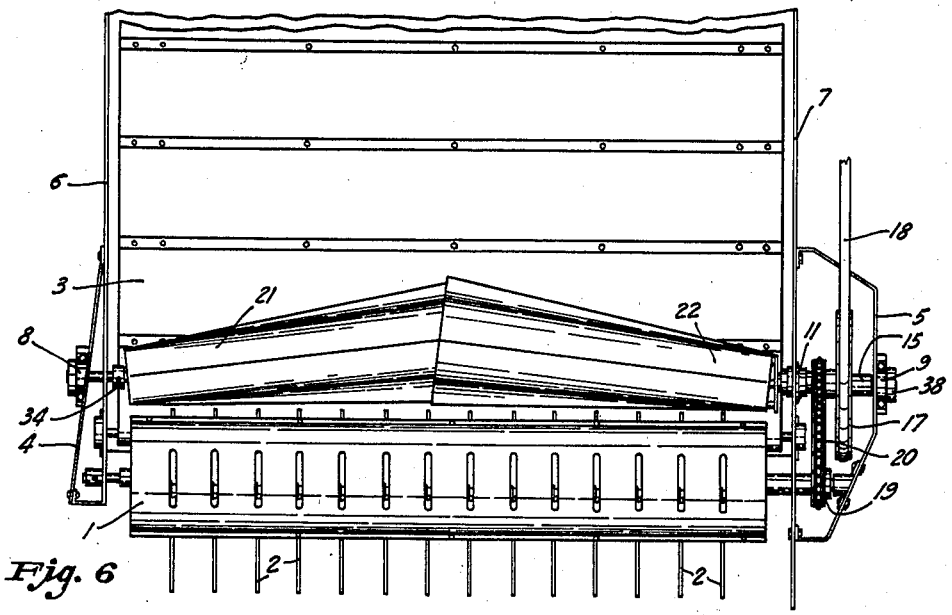
Fig. 6 is a plan comparable to Fig. 1 but showing the slinger complete instead of in section.
Figure 7:
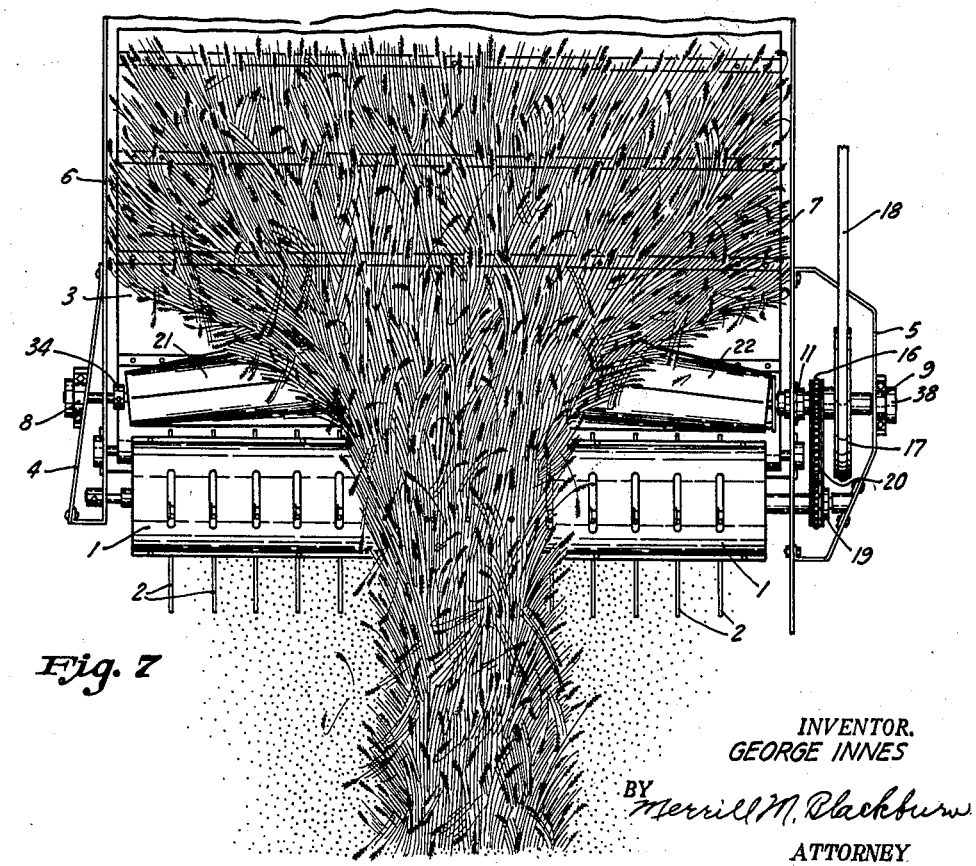
Fig. 7 is a plan showing the distribution of the grain delivered by the pick-up to the slinger, and by the latter to the apron.

Adjacent the middle bend 12 of the shaft 10 are mounted plates 23 and 26, comparable to those described above, the plate 23 being provided with fingers 24 and the plate 26 with holes 25, these fingers and holes cooperating as above described. Holding these plates in position on the shaft 10 are collar 36, comparable to the collar 34, these collars being pinned to the shaft 10, as shown clearly in Fig. 4. These collars are engaged by the ends of the sleeves 27 and thus prevent the plates from moving laterally away from each other. At one or both ends of the shaft 10 are secured adjusting arms 38 by means of which the shaft 10 can be rotated a partial turn. Any suitable securing means 39 passes through the arm 38 and into any one of a plurality of holes 40 in the plate 41 secured to the bracket 5. The securing means 39 may take the form of a bolt having a threaded portion near its head and a smaller extremity to fit into the holes 40. The opening in the arm 38 may be screw-threaded to receive the screw-threaded portion of the bolt 39. By adjusting the arm 38, the height of the distributor with respect to the pick-up may be adjusted. The side of the distributor adjacent the pick-up is substantially parallel to the axis thereof and adjustments of the shaft 10 make little change in this condition of parallelism or the height of the end portions of the distributor, though it may make considerable difference in the height of the center portion of the distributor. In order that the grain stalks shall not follow the pick-up drum and go down between the pick-up and the apron, the distributor is near enough to the pick-up to take hold of the grain and pull it away from the drum, distributing it upon the apron.

Let us assume that the machine is being propelled through a field in which the grain has been cut and deposited in windrows. The machine is propelled so that the middle portion of the pick-up I engages the windrow. Now, as the machine moves through the field, the pick-up raises the grain and deposits it upon the distributor at its central portion. Because the tops of the distributor sections slope laterally toward the sides of the machine, because of the high peripheral velocity of the larger part of the distributor, because of the pyramidal shape of the distributor sections, because of the high traction of the edges of the distributor, and because of the direction of rotation of the distributor sections, the straws are pulled out of the windrow on its way to the apron and thrown diagonally, thus causing separation of the windrow into parts which are distributed over the apron. This tends to give an even delivery from the apron 3 to that part of the machine to which the apron makes delivery, namely, the threshing cylinder.

It is obvious from the drawings that the distributor sections 21 and 22 are essentially truncated prisms having reentrant angles upon the sides thereof. This causes the edges of the distributor sections to have a substantially greater gripping force upon the grain than if the distributor were more nearly rectangular in cross-section.

It will of course be understood that the specific description of structure disclosed herein may be departed from without departing from the spirit of this invention as set forth in this specification and the appended claims.

Having now described my invention, I claim:

1. In a machine comprising a pick-up, a conveyor belt, and driving means for operating these parts; the combination of a distributor located above and between the pick-up and the belt and operable to convey grain received from the pick-up to the belt, the distributor being constructed in two parts mounted upon axes arranged at an angle to each other and rotatable in directions which are not parallel, the directions of rotation being such as to tend to distribute grain laterally from the central portion of the distributor toward the lateral edges of the belt.

2. In a machine for the purpose indicated, having a pick-up, a conveyor belt, and driving means for operation thereof; the combination of a distributor having an axle upon which it may rotate above and between the pick-up and the belt, said distributor comprising a pair of truncated prisms having their bases adjacent each other, one of the bases being smaller than the other and located within it, and driving means for rotating the distributor in a direction to carry grain delivered to it by the pick-up to the belt.

3. In a machine for the purpose indicated comprising a conveyor belt and a pick-up for picking up grain from the ground and delivering it toward the belt; a distributor, located above and between the belt and the pick-up and being rotatable in a direction to force the grain received from the pick-up to be delivered to the belt, said distributor comprising a bent axle having ends extending in a direction generally parallel to the axis of the pick-up, a pair of truncated prisms having their small ends directed outwardly toward the sides of the machine, driving means for rotating the distributor in the same general direction as the pick-up, the base end of one distributor element being smaller than and received within the corresponding end of the other, driving connections between the distributor elements whereby to drive one from the other, and driving means for driving one of the distributor elements.

4. In a machine for the purpose indicated having a supporting structure and driving mechanism; a distributor for scattering grain delivered to the distributor, said distributor having a bent axle, the ends of which are substantially coaxial and the middle of which is bent to carry the main portion thereof substantially out of line with the ends, means for rotationally adjusting the axle and for holding the axle in rotationally adjusted position, truncated pyramidal distributor elements mounted on said axle with their small ends facing outwardly, the large ends being connected together in driving relation, and means for rotating the rotatable parts of the distributor about its axle.

5. A grain distributor for a pick-up mechanism comprising a normally fixed but rotationally adjustable shaft mounted above and rearwardly from the pick-up drum, driving means, and a pair of truncated pyramidal elements rotatably mounted on said shaft, said elements being connected to the driving means to be rotated thereby, said shaft being in the form of a plurality of sections coupled together, the shaft being bent adjacent its ends and approximately midway so that the forward portions of said elements will be approximately parallel with the axis of the drum as the elements are rotated on said shaft, said elements having bearing elements surrounding said shaft whereby the elements are rotatably carried by the shaft.

6. A grain distributor for a pick-up mechanism having a supporting framework, comprising a shaft mounted in said framework for rotational adjustment and having means for securing it in adjusted position, said shaft being made up of three sections coupled together, the middle portion of the middle section being bent to put the ends out of alignment with the middle, and the end sections being bent to bring the end portions of the shaft into approximate alignment from which the central portion of the shaft is offset rearwardly, truncated pyramidal sections each having at each end supporting means for mounting the sections on the shaft, rotatably, the sections being connected together for simultaneous rotation with the side adjacent the pick-up drum approximately parallel thereto, the side faces of the distributor elements being bent longitudinally approximately centrally into dihedral angles, and means connecting the distributor elements in driving relation.

7. In a machine for the purpose indicated, supporting means having a belt thereon for conveying grain to a point of delivery to another mechanism, a pick-up associated therewith for picking up grain from a windrow and passing it toward the conveyor belt, said conveyor belt running in the direction of rotation of the pick-up, a distributor unit above the belt to spread it out laterally from a central point toward lateral edges of the belt, the distributor unit having a pair of approximately horizontal axes arranged at an angle to each other and a pair of rotary units thereon mounted to rotate about the axes, the distributor axes defining a plane roughly parallel to the plane of the belt, and operating means to drive the pick-up, the distributor and the belt, whereby to spread the grain upon the conveyor belt.

GEORGE INNES.